(12) United States Patent
Zhang et al.

(10) Patent No.: US 8,553,521 B2
(45) Date of Patent: Oct. 8, 2013

(54) MIMO BEAMFORMING-BASED SINGLE CARRIER FREQUENCY DIVISION MULTIPLE ACCESS SYSTEM

(75) Inventors: Guodong Zhang, Farmingdale, NY (US); Jung-Lin Pan, Selden, NY (US); Robert Lind Olesen, Huntington, NY (US); Yingming Tsai, Boonton, NJ (US)

(73) Assignee: Interdigital Technology Corporation, Wilmington, DE (US)

( * ) Notice: Subject to any disclaimer, the term of this patent is extended or adjusted under 35 U.S.C. 154(b) by 614 days.

(21) Appl. No.: 12/377,975

(22) PCT Filed: Sep. 25, 2006

(86) PCT No.: PCT/US2006/037391
§ 371 (c)(1),
(2), (4) Date: Feb. 18, 2009

(87) PCT Pub. No.: WO2007/041086
PCT Pub. Date: Apr. 12, 2007

(65) Prior Publication Data
US 2010/0246377 A1    Sep. 30, 2010

Related U.S. Application Data

(60) Provisional application No. 60/722,022, filed on Sep. 29, 2005.

(51) Int. Cl.
*H04J 11/00* (2006.01)
(52) U.S. Cl.
USPC ............................ 370/203; 370/210; 370/252
(58) Field of Classification Search
USPC ........................................ 370/203, 210, 252
See application file for complete search history.

(56) References Cited

U.S. PATENT DOCUMENTS 6,094,601 A * 7/2000 Popovich ........................ 700/28
6,850,481 B2   2/2005 Wu et al.
(Continued)

FOREIGN PATENT DOCUMENTS

CN    1467996    1/2004
EP    1938543 B1  7/2008
(Continued)

OTHER PUBLICATIONS

3rd Generation Partnership Project (3GPP), R1-050245, "Uplink Multiple Access for EUTRA", Motorola, 3GPP TSG RAN WG1 Meeting #40bis, Apr. 4-8, 2005, 11 pages.

(Continued)

*Primary Examiner* — Jason Mattis
(74) *Attorney, Agent, or Firm* — Condo Roccia LLP

(57) ABSTRACT

A multiple-input multiple-output (MIMO) beamforming-based single carrier frequency division multiple access (SC-FDMA) system is disclosed. At the transmitter, a fast Fourier transform (FFT) is performed on transmission data to generate frequency domain data. The frequency domain transmit data is mapped to assigned subcarriers. An inverse fast Fourier transform (IFFT) is performed on the transmit data mapped to the assigned subcarriers to generate time domain transmit data. The time domain transmit data is transmitted via antennas. At a receiver, an FFT is performed on the received data to generate frequency domain received data. Subcarrier demapping is performed to extract data mapped on the assigned subcarriers. A channel estimator generates a channel matrix which is decomposed into U, D and $V^H$ matrices. A channel distortion and interference between transmit and receive antennas are equalized based on the decomposed channel matrices to the extracted frequency domain received data.

17 Claims, 2 Drawing Sheets

(56) References Cited

U.S. PATENT DOCUMENTS

| | | | |
|---|---|---|---|
| 7,787,824 B2 | 8/2010 | Bocquet et al. | |
| 2002/0122381 A1 | 9/2002 | Wu et al. | |
| 2003/0128160 A1* | 7/2003 | Sim ............................... | 342/382 |
| 2004/0047426 A1* | 3/2004 | Nissani Nissensohn ...... | 375/259 |
| 2004/0076124 A1* | 4/2004 | Agrawal et al. .............. | 370/310 |
| 2005/0070323 A1* | 3/2005 | Lozano et al. ................. | 455/522 |
| 2005/0249304 A1* | 11/2005 | Takano et al. ................. | 375/267 |
| 2006/0227859 A1* | 10/2006 | Wei et al. ...................... | 375/233 |
| 2006/0239366 A1* | 10/2006 | Kim et al. ...................... | 375/260 |
| 2007/0041457 A1* | 2/2007 | Kadous et al. ................ | 375/260 |
| 2008/0219341 A1* | 9/2008 | Kim ............................... | 375/232 |
| 2009/0207078 A1* | 8/2009 | Fletcher et al. ............... | 342/377 |
| 2009/0316307 A1* | 12/2009 | Olesen et al. ................. | 360/267 |

FOREIGN PATENT DOCUMENTS

| | | |
|---|---|---|
| JP | 2006-504287 | 2/2006 |
| JP | 2006-513675 | 4/2006 |
| JP | 2006-522505 | 9/2006 |
| JP | 2012-178850 | 9/2012 |
| WO | WO 2004/002047 | 12/2003 |
| WO | WO 2004/038985 | 5/2004 |
| WO | WO 2005-022797 | 3/2005 |
| WO | WO 2005/053186 | 6/2005 |
| WO | WO 2005-055465 | 6/2005 |
| WO | WO 2006/016409 | 2/2006 |

OTHER PUBLICATIONS

3rd Generation Partnership Project (3GPP), R1-050702, "DFT-Spread OFDM with Pulse Shaping Filter in Frequency Domain in Evolved UTRA Uplink", NTT DoCoMo, NEC, Sharp, 3GPP TSG RAN WG1 Meeting #42, Aug. 29-Sep. 2, 2005, 8 pages.

3rd Generation Partnership Project (3GPP), R1-050765, "Some Aspects of Single-Carrier Transmission for E-UTRA", Ericsson, 3GPP TSG RAN WG1 Meeting #42, Aug. 29-Sep. 2, 2005, 5 pages.

Kobayashi et al., "Single Carrier OFDM Technique with Adaptive Modulation Method", The IEICE Transactions, The Institute of Electronics, Information and Communication Engineers, Japan, Dec. 1, 2003, vol. J86-A, No. 12, 1329-1339.

Ozaki et al., "Transit Performance of E-SDM with Frequency Domain Equalization", Technical Report of IECE, RCS2005-195, The Institute of Electronics, Information and Communication Engineers, Japan, Feb. 22, 2006, vol. 105, No. 623, 103-108.

Sorger et al., "Interleaved FDMA—A New Spread-Spectrum Multiple-Access Scheme", 1998 IEEE International Conference on Communications, vol. 2 Conf. 5, pp. 1013-1017, (Jun. 7, 1998).

Myung et al., "Single Carrier FDMA for Uplink Wireless Transmission," IEEE Vehicular Technology Magazine, vol. 1, No. 3, pp. 30-38 (Sep. 2006).

Sampath, "Linear Precoding and Decoding for Multiple Input Multiple Output (MIMO) Wireless Channels", Dissertation, Stanford University, Apr. 2001, 196 pages.

3rd Generation Partnership Project (3GPP), R1-050588, "Radio Parameter Set for Single-Carrier Based Radio Access in Evolved UTRA Uplink", NTT DoCoMo, Fujitsu, Mitsubishi Electric, Sharp, 3GPP TSG-RAN WG1 Ad Hoc on LTE, Sophia Antipolis, France, Jun. 20-21, 2005, 21 pages.

Daneshrad et al., "Performance and Implementation of Clustered-OFDM for Wireless Communications," Mobile Networks and Applications, pp. 305-314 (1997).

Myung et al., "Single Carrier FDMA for Uplink Wireless Transmission," IEEE Vehicular Technology Magazine, vol. 1, No. 3 pp. 30-38 (Sep. 2006).

Sorger et al., "Interleaved FDMA—New Spread-Spectrum Multiple-Access Scheme", 1998 IEEE International Conference on Communications, vol. 2 Conf. 5, pp. 1013-1017, (Jun. 7, 1998).

Wubben et al., "MMSE Extension of V-BLAST Based on Sorted QR Decomposition," Vehicular Technology Conference, vol. 1, pp. 508-512 (Oct. 2003).

Kudo et al., "Performance evaluation of 4x4 broadband MIMO-OFDM transceiver in an actual indoor environment (2)", Technical Report of The Institute of Electronics, Information and Communication Engineers, Japan, Feb. 24, 2005 ,105-110.

Wong et al., "Adaptive Antennas at the Mobile and Base Stations in an OFDM/TDMA System", IEEE Transactions on Communications, vol. 49, No. 1, Jan. 2001, 195-206.

* cited by examiner

MIMO BEAMFORMING-BASED SINGLE CARRIER FREQUENCY DIVISION MULTIPLE ACCESS SYSTEM

CROSS-REFERENCE TO RELATED APPLICATIONS

This application is the National Stage of PCT Application No. PCT/US2006/037391, filed Sep. 25, 2006, which claims the benefit of U.S. Provisional Patent Application No. 60/722, 022 filed Sep. 29, 2005, the contents of which are hereby incorporated by reference herein.

FIELD OF INVENTION

The present invention is related to a wireless communication system. More particularly, the present invention is related to a multiple-input multiple-output (MIMO) beamforming-based single carrier frequency division multiple access (SC-FDMA) system.

BACKGROUND

The third generation partnership project (3GPP) and 3GPP2 are currently considering a long term evolution (LTE) of the universal mobile telecommunication system (UMTS) terrestrial radio access (UTRA). Currently, SC-FDMA is being considered for the evolved UTRA (E-UTRA).

In SC-FDMA, a plurality of orthogonal subcarriers are divided into a plurality of subcarrier blocks, (also known as "resource blocks"). A subcarrier block may be a localized subcarrier block or a distributed subcarrier block. The localized subcarrier block is defined as a set of several consecutive subcarriers and the distributed subcarrier block is defined as a set of several non-consecutive subcarriers. A subcarrier block is a basic scheduling unit for uplink transmissions in an SC-FDMA system. Depending on a data rate or a buffer status, at least one subcarrier block is assigned for a wireless transmit/receive unit (WTRU) for transmission.

MIMO refers to the type of wireless transmission and reception scheme where both a transmitter and a receiver employ more than one antenna. A MIMO system takes advantage of the spatial diversity or spatial multiplexing to improve the signal-to-noise ratio (SNR) and increases throughput.

SUMMARY

The present invention is related to a MIMO beamforming-based SC-FDMA system which includes a transmitter and a receiver. At the transmitter, a fast Fourier transform (FFT) is performed on data for transmission to generate frequency domain transmit data. Subcarrier mapping units map the frequency domain transmit data to assigned subcarriers. An inverse Fourier transform (IFFT) is performed on the transmit data mapped to the assigned subcarriers to generate time domain transmit data, and the time domain transmit data is then transmitted via multiple antennas. At the receiver, transmitted data is detected by a plurality of receive antennas. An FFT is performed on received data to generate frequency domain received data. Subcarrier demapping units in the receiver extract data mapped on the assigned subcarriers. A channel estimator in the receiver generates a channel matrix and a singular value decomposition (SVD) unit decomposes the channel matrix into U, D and $V^H$ matrices. A channel diagonalization and beamforming unit in the receiver then equalizes a channel distortion and interference between transmit and receive antennas based on decomposed channel matrices to the extracted frequency domain received data.

DETAILED DESCRIPTION OF THE PREFERRED EMBODIMENTS

When referred to hereafter, the terminology "WTRU" includes, but is not limited to, a user equipment (UE), a mobile station, a fixed or mobile subscriber unit, a pager, or any other type of device capable of operating in a wireless environment. When referred to hereafter, the terminology "base station" includes, but is not limited to, a Node-B, a site controller, an access point (AP) or any other type of interfacing device in a wireless environment. The present invention may be implemented in a WTRU or a base station.

The features of the present invention may be incorporated into an integrated circuit (IC) or be configured in a circuit comprising a multitude of interconnecting components.

Figure 1:
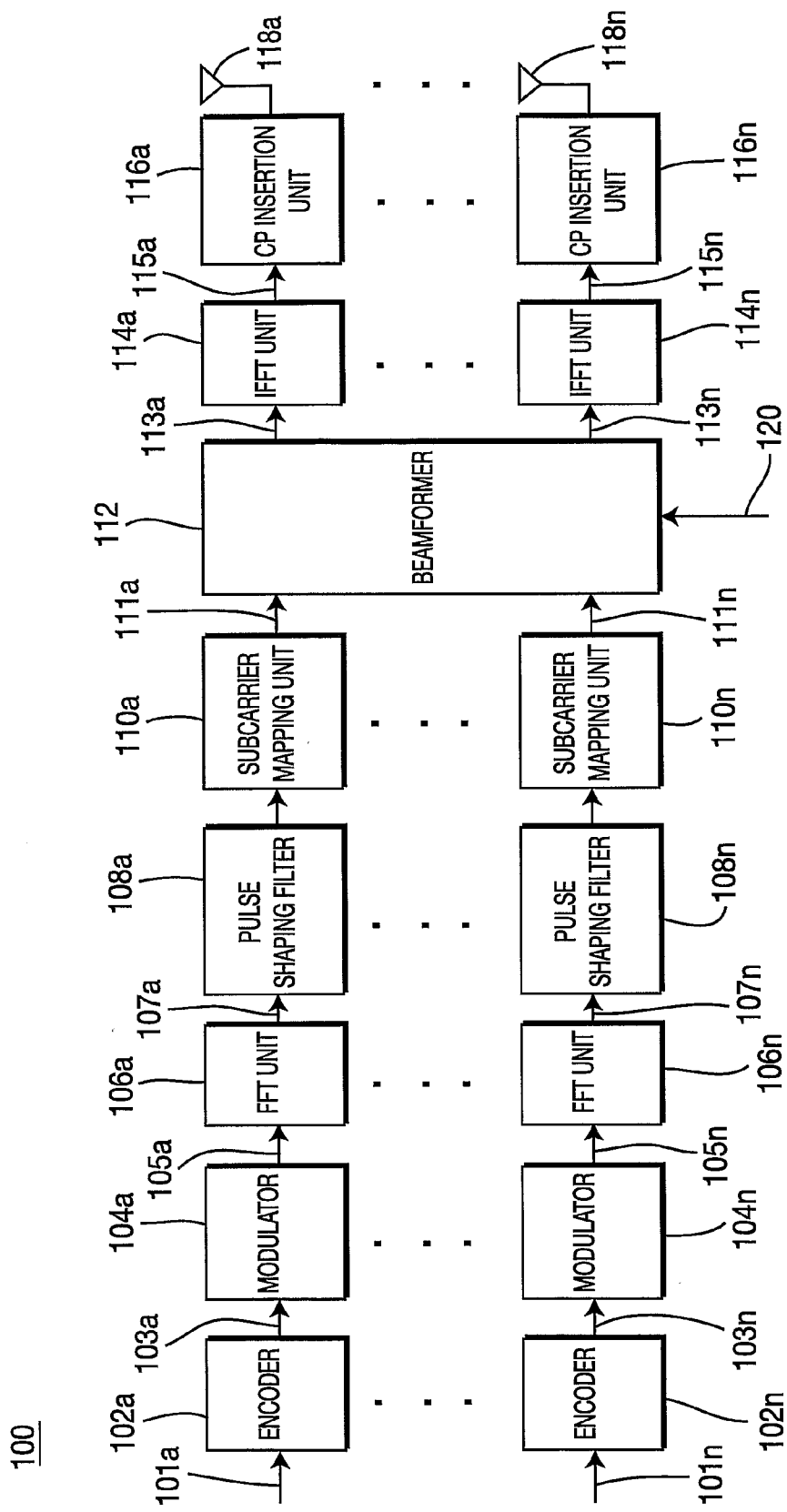
FIG. 1 is a block diagram of a transmitter configured in accordance with the present invention.

FIG. 1 is a block diagram of a transmitter 100 configured in accordance with the present invention. It should be noted that FIG. 1 is provided as an example and the functions performed by the components shown in FIG. 1 may be performed by more or less physical components. The transmitter 100 includes encoders 102a-102n, modulators 104a-104n, fast Fourier transform (FFT) units 106a-106n, pulse shaping filters 108a-108n, subcarrier mapping units 110a-110n, a beam former 112 (optional), inverse FFT (IFFT) units 114a-114n, cyclic prefix (CP) insertion units 116a-116n and multiple antennas 118a-118n for MIMO.

Data 101a-101n for transmission is encoded by the encoders 102a-102n. It should be noted that the transmitter 100 may include only one encoder depending on the system configuration. The encoded input data 103a-103n is modulated by the modulators 104a-104n, respectively, in accordance with a modulation scheme. The modulated input data 105a-105n is processed by the FFT units 106a-106n to be converted into frequency domain data 107a-107n, respectively. The frequency domain data 107a-107n is processed through the pulse shaping filters 108a-108n, respectively. After processing by the pulse shaping filters 108a-108n, the frequency domain data 107a-107n is mapped to assigned subcarriers by the subcarrier mapping units 110a-110n, respectively. The subcarrier mapped data 111a-111n may optionally be processed with a transmit beam forming matrix and/or a scaling factor 120 by the beam former 112, which will be explained in detail hereinafter.

The subcarrier mapped data 111a-111n, (or data 113a-113n processed by the beamformer 112), is then processed by the IFFT units 114a-114n to be converted into time domain data 115a-115n, respectively. A CP is then added to the time domain data 115a-115n by the CP insertion units 116a-116n and transmitted via the antennas 118a-118n, respectively.

Figure 2:
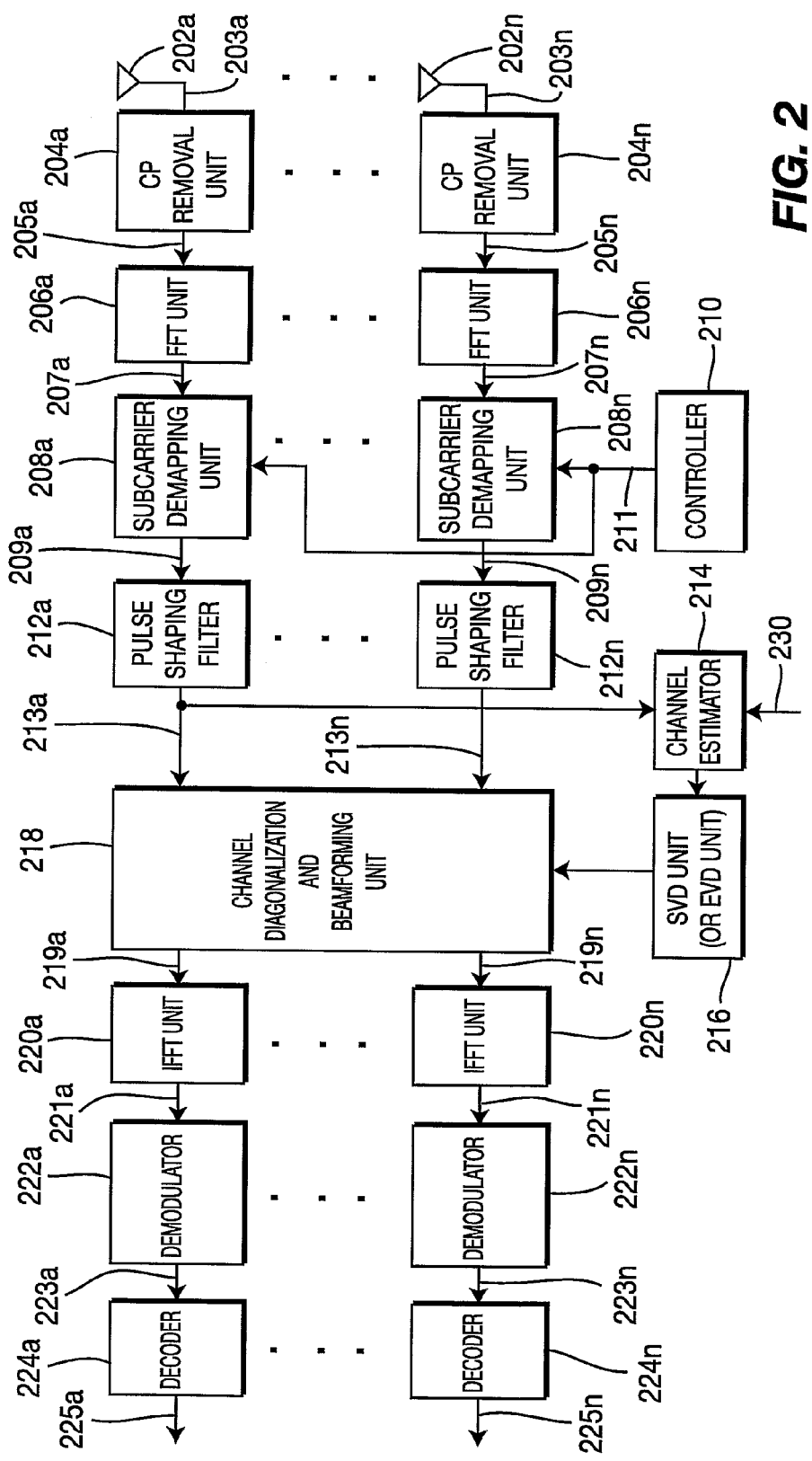
FIG. 2 is a block diagram of a receiver configured in accordance with the present invention.

FIG. 2 is a block diagram of a receiver 200 configured in accordance with the present invention. It should be noted that FIG. 2 is provided as an example and the functions performed by the components shown in FIG. 2 may be performed by more or less physical components. The receiver 200 includes multiple antennas 202a-202n, CP removal units 204a-204n, FFT units 206a-206n, subcarrier demapping units 208a-208n, a controller 210, pulse shaping filters 212a-21211, a channel estimator 214, a singular value decomposition (SVD) unit 216, a channel diagonalization and beamforming unit 218, IFFT units 220a-220n, demodulators 222a-222n and decoders 224a-224n.

Signals transmitted from the transmitter 100 are detected by the multiple antennas 202a-202n and multiple received data streams 203a-203n are generated. Each received data stream 203a-203n is processed by the CP removal unit 204a-204n, respectively, to remove the CP which is inserted at the transmitter 100.

After removing the CP, the received data streams 205a-205n are sent to the FFT units 206a-206n to be converted to frequency domain data 207a-207n, respectively. Each of the subcarrier demapping units 208a-208n extracts particular subcarrier signals 209a-209n in accordance with a control signal 211 received from the controller 210. The controller 210 generates the control signal 211 based on the assigned subcarriers for the receiver 200. The assigned subcarriers may be a block of localized subcarriers or a set of distributed subcarriers.

The extracted subcarrier data 209a-209n is then processed through the pulse shaping filters 212a-212n, respectively. After processing by the pulse shaping filters 212a-212n, the data 213a-213n is then sent to the channel diagonalization and beamforming unit 218 and the channel estimator 214. The channel estimator 214 generates a channel impulse response using a known pilot signal 230 and generates a channel matrix $H_n^{(k)}$ for each subcarrier. The channel estimator 214 may be a joint channel estimator, as shown in FIG. 2. Alternatively, multiple channel estimators may be used for processing the multiple receive data streams 213a-213n, respectively. The channel matrix $H_n^{(k)}$ is sent to the SVD unit 216.

The SVD unit 216 decomposes the channel matrix $H_n^{(k)}$ into a diagonal matrix $D_n^{(k)}$ and unitary matrices $U_n^{(k)}$ and $V_n^{(k)}$ such that:

$$H_n^{(k)} = U_n^{(k)} D_n^{(k)} V_n^{(k)H}; \quad \text{Equation (1)}$$

where superscript H denotes Hermitian transpose. $U_n^{(k)}$ and $V_n^{(k)}$ are unitary matrices for the k-th user and the n-th subcarrier and comprise eigenvectors of the matrix $H_n^{(k)} H_n^{(k)H}$ and $H_n^{(k)H} H_n^{(k)}$, respectively. $U_n^{(k)H} U_n^{(k)} = V_n^{(k)H} V_n^{(k)} = I$. The diagonal matrix $D_n^{(k)}$ comprises the square root of the eigenvalues of $H_n^{(k)} H_n^{(k)H}$. It should be noted that SVD is an example for channel matrix decomposition, and the channel matrix decomposition may be performed with any other matrix decomposition methods, (such as eigenvalue decomposition (EVD)), to achieve the same results.

In accordance with a first embodiment of the present invention, the decomposed matrices, $U_n^{(k)}$, $D_n^{(k)}$ and $V_n^{(k)}$, are sent to the channel diagonalization and beamforming unit 218 and the channel diagonalization and beamforming unit 218 performs frequency domain equalization so that channel distortions and interferences between antennas are eliminated.

The received signal in frequency domain is expressed as follows:

$$\vec{R}_n^{(k)} = \overline{H}_n^{(k)} \cdot \vec{S}_n^{(k)} + \vec{N}_n^{(k)}, \quad \text{Equation (2)}$$

where $\vec{R}_n^{(k)}$ and $\vec{S}_n^{(k)}$ are the received signal and the transmitted data in frequency domain for the n-th subcarrier of the user k, respectively and $\vec{N}_n^{(k)}$ is a noise. The channel diagonalization and beamforming unit 218 equalizes the channel distortion and interference by applying the matrix $U_n^{(k)H}$ and $V_n^{(k)} D_n^{(k)-1}$ to the frequency domain received signal $\vec{R}_n^{(k)}$. The resulting signal after diagonalization $\vec{R}_{D,n}^{(k)}$ expressed as follows:

$$\vec{R}_{D,n}^{(k)} = V_n^{(k)} D_n^{(k)-1} U_n^{(k)H} \vec{R}_n^{(k)} = V_n^{(k)} D_n^{(k)-1} U_n^{(k)H} \vec{N}_n^{(k)}; \quad \text{Equation (3)}$$

which is frequency domain data plus noise.

Equation (3) is a zero forcing solution for performing a beamforming only at the receiver 200. This solution may equalize the channel distortion and antenna interference, but enhances noise.

After channel diagonalization by the channel diagonalization and beamforming unit 218, the data 219a-219n is processed by the IFFT units 220a-220n to be converted to time domain data 221a-221n, respectively. The time domain data 221a-221n is demodulated by the demodulators 222a-222n, respectively, and the demodulated data 223a-223n is processed by the decoders 224a-224n to generate estimated data 225a-225n, respectively. Only one decoder may be used depending on the system configuration.

In accordance with a second embodiment of the present invention, a beam forming is performed both at the transmitter 100 and the receiver 200. At the transmitter 100, the data 101 for transmission is scaled with an inverse of the diagonal matrix D and multiplied by the steering matrix V by the beamformer 112. Alternatively, the transmitter 100 may apply only the steering matrix V. The matrices D and V may be fed back by the receiver 200 to the transmitter 100. Alternatively, the transmitter 100 may include a channel estimator and an SVD unit such that the D and V matrices may be obtained by the transmitter 100 based on channel reciprocity. This operation is expressed per user and subcarrier as follows:

$$\tilde{\vec{S}}_n^{(k)} = V_n^{(k)} D_n^{(k)-1} \vec{S}_n^{(k)}. \quad \text{Equation (4)}$$

The received signal is expressed as follows:

$$\vec{R}_n^{(k)} = \overline{H}_n^{(k)} \cdot \tilde{\vec{S}}_n^{(k)} + \vec{N}_n^{(k)}. \quad \text{Equation (5)}$$

At the receiver 200, a receive beamforming is performed by multiplying a matrix $U_n^{(k)H}$ on the received signal $\vec{R}_n^{(k)}$ by the channel diagonalization and beamforming unit 218. The resulting signal after beamforming is as follows:

$$\vec{R}_{D,n}^{(k)} = \vec{S}_n^{(k)} + U_n^{(k)H} \vec{N}_n^{(k)}. \quad \text{Equation (6)}$$

Equation (6) is a zero forcing solution for performing a beamforming both at the transmitter 100 and the receiver 200. This solution avoids noise enhancement problem of the solution in Equation (3) by performing a pre-beamforming with equalization at the transmitter 100. However, the solution in Equation (7) enlarges the peak-to-average power ratio (PAPR) at the transmitter 100.

In accordance with a third embodiment of the present invention, a minimum mean square error (MMSE) solution is used to suppress a PAPR at the transmitter 100. The beamforming at the transmitter 100 in accordance with the third embodiment requires feedback information from the receiver 200. The feedback information includes $D_n^{(k)}$ and $V_n^{(k)}$ matrices and estimated SNR. The feedback information may be full feedback information or partial feedback information. The beamformer 122 of the transmitter 100 scales and steers the data 101 for transmission based on MMSE solution as follows:

$$\tilde{\vec{S}}_n^{(k)} = V_n^{(k)} \frac{D_n^{(k)*}}{|D_n^{(k)}|^2 + \sigma^2} \cdot \vec{S}_n^{(k)}. \quad \text{Equation (7)}$$

The received signal is expressed as follows:

$$\vec{R}_n^{(k)} = \vec{H}_n^{(k)} \cdot \vec{S}_n^{(k)} + \vec{N}_n^{(k)}.$$ Equation (8)

After the channel diagonlization and beamforming unit 218 performs a receive beamforming by multiplying a matrix $U_n^{(k)^H}$, the resulting signal is expressed as follows:

$$\vec{R}_{D,n}^{(k)} = \frac{\left|\vec{D}_n^{(k)}\right|^2}{\left|\vec{D}_n^{(k)}\right|^2 + \sigma^2} \cdot \vec{S}_n^{(k)} + U_n^{(k)H} \vec{N}_n^{(k)}.$$ Equation (9)

The PAPR is reduced as shown in Equation (7). The estimated data at the receiver 200 approaches the transmitted data when a signal-to-noise ratio (SNR) is large as shown in Equation (9).

In accordance with a fourth embodiment, a beamforming is performed only at the receiver 200 and no feedback is sent to the transmitter 100. A received signal after receive beamforming and noise suppression by the channel diagonalization and beamforming unit 218 based on MMSE solution is expressed as follows:

$$\vec{R}_{D,n}^{(k)} = V_n^{(k)} \frac{\vec{D}_n^{(k)*}}{\left|\vec{D}_n^{(k)}\right|^2 + \sigma^2} \cdot U_n^{(k)H} \vec{R}_n^{(k)}; \text{ and}$$ Equation (10)

$$\vec{R}_{D,n}^{(k)} = V_n^{(k)} \frac{\left|\vec{D}_n^{(k)}\right|^2}{\left|\vec{D}_n^{(k)}\right|^2 + \sigma^2} \cdot V_n^{(k)H} \vec{S}_n^{(k)} + V_n^{(k)} \frac{\vec{D}_n^{(k)*}}{\left|\vec{D}_n^{(k)}\right|^2 + \sigma^2} \cdot U_n^{(k)H} \vec{N}_n^{(k)}.$$ Equation (11)

As shown in Equation (11), the equalized signal after beamforming at the receiver 200 approaches transmitted data at a high SNR. This is because the middle term $$\frac{\left|\vec{D}_n^{(k)}\right|^2}{\left|\vec{D}_n^{(k)}\right|^2 + \sigma^2}$$

becomes identity at a high SNR and $V_n^{(k)} V_n^{(k)H} = I$. At a low SNR, the equalized beamforming signal at the receiver 200 is estimated with an approximation error, (i.e., $\vec{R}_{D,n}^{(k)} \approx \vec{S}_n^{(k)}$ plus the error caused by noise).

Embodiments

1. An SC-FDMA system wherein a portion of a plurality of subcarriers is assigned to a transmitter and a receiver for communication.

2. The system of embodiment 1 comprising a MIMO transmitter.

3. The system of embodiment 2 wherein the MIMO transmitter comprises a first set of FFT units for performing FFT on data for transmission to generate frequency domain data.

4. The system of embodiment 3 wherein the MIMO transmitter comprises a plurality of subcarrier mapping units for mapping the frequency domain transmit data on subcarriers assigned for the MIMO transmitter and a MIMO receiver.

5. The system of embodiment 4 wherein the MIMO transmitter comprises a first set of IFFT units for performing IFFT on transmit data mapped to the assigned subcarriers to generate time domain transmit data.

6. The system of embodiment 5 wherein the MIMO transmitter comprises a plurality of transmit antennas for transmitting the time domain transmit data.

7. The system as in any of the embodiments 1-6, comprising a MIMO receiver.

8. The system of embodiment 7 wherein the MIMO receiver comprises a plurality of receive antennas for receiving the transmitted time domain transmit data and generating multiple streams of received data.

9. The system of embodiment 8 wherein the MIMO receiver comprises a second set of FFT units for performing FFT on the received data to generate frequency domain received data.

10. The system of embodiment 9 wherein the MIMO receiver comprises a plurality of subcarrier demapping units for extracting data mapped on the assigned subcarriers.

11. The system as in any of the embodiments 7-10, wherein the MIMO receiver comprises at least one channel estimator for performing channel estimation for MIMO channels between the transmitter and the receiver to generate a channel matrix.

12. The system of embodiment 11 wherein the MIMO receiver comprises a channel matrix decomposition unit for decomposing the channel matrix into a diagonal matrix D and unitary matrices U and $V^H$, wherein a superscript H denotes a Hermitian transpose.

13. The system of embodiment 12 wherein the MIMO receiver comprises a channel diagonalization and beamforming unit for equalizing a channel distortion by applying at least one of the U, D and $V^H$ matrices to the extracted frequency domain received data.

14. The system of embodiment 13 wherein the MIMO receiver comprises a second set of IFFT units for performing IFFT on the equalized data to generate time domain received data.

15. The system as in any of the embodiments 13-14, wherein the channel diagonalization and beamforming unit equalizes the channel distortion based on a zero forcing solution.

16. The system as in any of the embodiments 13-14, wherein the channel diagonalization and beamforming unit equalizes the channel distortion based on an MMSE solution.

17. The system as in any of the embodiments 2-16, wherein the MIMO transmitter further comprises a beamformer for performing a transmit beamforming by applying the V matrix to the frequency domain transmit data.

18. The system of embodiment 17 wherein the MIMO transmitter obtains the V matrix from the receiver.

19. The system as in any of the embodiments 17-18, wherein the MIMO transmitter further comprises a second channel estimator for performing channel estimation to obtain the V matrix based on channel reciprocity.

20. The system as in any of the embodiments 17-19, wherein the beamformer applies a scaling factor.

21. The system of embodiment 20 wherein the scaling factor is an inverse D matrix.

22. The system of embodiment 20 wherein the scaling factor is generated based on the D matrix and a noise variance.

23. The system as in any of the embodiments 1-22, wherein the subcarriers assigned to the MIMO receiver are a block of localized subcarriers.

24. The system as in any of the embodiments 1-22, wherein the subcarriers assigned to the MIMO receiver are a set of distributed subcarriers.

25. The system as in any of the embodiments 2-24, wherein the MIMO transmitter further comprises a CP insertion unit for inserting a CP into the time domain transmit data.

26. The system of embodiment 25 wherein the MIMO receiver further comprises a CP removal unit for removing the CP from the received data.

27. The system as in any of the embodiments 10-26, wherein the MIMO receiver further comprises a controller for generating a control signal indicating the subcarriers which are assigned to the receiver, whereby the subcarrier demapping units extract the particular data mapped on the subcarriers based on the control signal.

28. The system as in any of the embodiments 12-27, wherein the channel matrix decomposition unit is an SVD unit.

29. The system as in any of the embodiments 12-27, wherein the channel matrix decomposition unit is an EVD unit.

30. The system as in any of the embodiments 2-29, wherein the MIMO transmitter is a WTRU.

31. The system as in any of the embodiments 7-30, wherein the MIMO receiver is a base station.

32. The system as in any of the embodiments 2-29, wherein the transmitter is a base station.

33. The system as in any of the embodiments 7-30, wherein the receiver is a WTRU.

34. A method for MIMO beamforming in an SC-FDMA system wherein a portion of a plurality of subcarriers is assigned to a transmitter and a receiver for communication.

35. The method of embodiment 34 comprising the step of the transmitter performing FFT on data for transmission to generate frequency domain data.

36. The method of embodiment 35 comprising the step of the transmitter mapping the frequency domain transmit data to subcarriers assigned for the transmitter and the receiver.

37. The method of embodiment 36 comprising the step of the transmitter performing IFFT on the transmit data mapped to the assigned subcarriers to generate time domain transmit data.

38. The method of embodiment 37 comprising the step of the transmitter transmitting the time domain transmit data via multiple antennas.

39. The method of embodiment 38 comprising the step of the receiver receiving the transmitted time domain transmit data and generating multiple streams of received data.

40. The method of embodiment 39 comprising the step of the receiver performing FFT on the received data to generate frequency domain received data.

41. The method of embodiment 40 comprising the step of the receiver extracting data mapped on the assigned subcarriers.

42. The method of embodiment 41 comprising the step of the receiver performing a channel estimation of MIMO channels between the transmitter and the receiver to generate a channel matrix.

43. The method of embodiment 42 comprising the step of the receiver decomposing the channel matrix into a diagonal matrix D and unitary matrices U and V$^H$, wherein a superscript H denotes a Hermitian transpose.

44. The method of embodiment 43 comprising the step of the receiver equalizing a channel distortion by applying the at least one of the U$^H$, D and V matrices to the extracted frequency domain received data.

45. The method of embodiment 44 comprising the step of the receiver performing IFFT on the equalized data to generate time domain received data.

46. The method as in any of the embodiments 44-45, wherein the channel distortion is equalized based on a zero forcing solution.

47. The method as in any of the embodiments 44-45, wherein the channel distortion is equalized based on an MMSE solution.

48. The method as in any of the embodiments 35-47, further comprising the step of the transmitter performing a transmit beamforming by applying the V matrix to the frequency domain transmit data.

49. The method of embodiment 48 wherein the transmitter obtains the V matrix from the receiver.

50. The method as in any of the embodiments 48-49, further comprising the step of the transmitter performing channel estimation to obtain the V matrix based on channel reciprocity.

51. The method as in any of the embodiments 36-50, further comprising the step of the transmitter applying a scaling factor to the frequency domain transmit data.

52. The method of embodiment 51 wherein the scaling factor is an inverse D matrix.

53. The method of embodiment 51 wherein the scaling factor is generated based on the D matrix and a noise variance.

54. The method as in any of the embodiments 34-53, wherein the subcarriers assigned to the receiver are a block of localized subcarriers.

55. The method as in any of the embodiments 34-53, wherein the subcarriers assigned to the receiver are a set of distributed subcarriers.

56. The method as in any of the embodiments 37-55, further comprising the step of the transmitter inserting a CP into the time domain transmit data.

57. The method of embodiment 56 comprising the step of the receiver removing the CP from the received data.

58. The method as in any of the embodiments 41-57, further comprising the step of the receiver generating a control signal indicating the subcarriers which are assigned to the receiver, whereby the data mapped on the assigned subcarriers is extracted based on the control signal.

59. The method as in any of the embodiments 43-58, wherein the channel matrix is decomposed by performing SVD.

60. The method as in any of the embodiments 43-58, wherein the channel matrix is decomposed by performing EVD.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A Wireless Transmit/Receive Unit (WTRU) for multiple-input multiple-output (MIMO) communication in a single carrier frequency division multiple access (SC-FDMA) system, the WTRU comprising:
   a first set of fast Fourier transform (FFT) units configured to perform FFT on data for transmission to generate frequency domain data;
   a beamformer configured to scale the frequency domain data with an inverse of a diagonal matrix (D) and apply a steering matrix (V) to the scaled frequency domain data, wherein the steering matrix (V) comprises eigenvectors of a matrix formed by a product of a Hermitian transpose of a channel matrix (H) and the channel matrix (H), and the diagonal matrix (D) comprises a square root of the eigenvalues of a product of the channel matrix (H) and the Hermitian transpose of the channel matrix (H);
   a plurality of subcarrier mapping units configured to map the frequency domain transmit data on subcarriers assigned for transmission;

a first set of inverse Fourier transform (IFFT) units configured to perform IFFT on transmit data mapped to the assigned subcarriers to generate time domain transmit data; and a plurality of transmit antennas configured to transmit the time domain transmit data.

2. The WTRU of claim 1, further comprising a receiver configured to receive feedback, wherein the feedback comprises an indication of one or more of the steering matrix (V) or the diagonal matrix (D).

3. The WTRU of claim 1 wherein the subcarriers assigned for transmission are a block of localized subcarriers.

4. The WTRU of claim 1 wherein the subcarriers assigned for transmission are a set of distributed subcarriers.

5. The WTRU of claim 1 further comprising a cyclic prefix (CP) insertion unit configured to insert a CP into the time domain transmit data.

6. The WTRU of claim 1, wherein the steering matrix (V) and the channel matrix H satisfy the equation $H=UDV^H$ and U is a unitary matrix comprising eigenvectors of a product of the channel matrix (H) and a Hermitian transpose of the channel matrix (H).

7. The WTRU of claim 1, further comprising a receiver configured to receive feedback, wherein the feedback indicates a value of a signal-to-noise ratio (SNR).

8. A base station for multiple-input multiple-output (MIMO) communication in a single carrier frequency division multiple access (SC-FDMA) system, the base station comprising:

a plurality of receive antennas configured to receive transmitted time domain transmit data and generate multiple streams of received data;

a set of FFT units configured to perform FFT on the received data to generate frequency domain received data;

a plurality of subcarrier demapping units configured to extract data mapped on the assigned subcarriers;

at least one channel estimator configured to perform a channel estimation for MIMO channels between a transmitter and a receiver at the base station to generate a channel matrix (H);

a channel matrix decomposition unit configured to decompose the channel matrix into a diagonal matrix (D), a unitary matrix (U), and a steering matrix (V), such that $H=UDV^H$, wherein a superscript H denotes a Hermitian transpose;

a channel diagonalization and beamforming unit configured to perform receive beamforming on the data mapped on the assigned subcarriers by applying a Hermitian transpose of the the unitary matrix (U) and a matrix comprised of a product of the steering matrix (V) and an inverse of the diagonal matrix (D) to the extracted frequency domain received data; and a second set of IFFT units configured to perform IFFT on the beamformed data to generate time domain received data.

9. The base station of claim 8 wherein the channel diagonalization and beamforming unit equalizes the channel distortion based on a zero forcing solution.

10. The base station of claim 8 wherein the channel diagonalization and beamforming unit equalizes the channel distortion based on a minimum mean square error (MMSE) solution.

11. The base station of claim 8, further comprising a transmitter configured to transmit feedback, wherein the feedback comprises an indication of one or more of the steering matrix (V) or the diagonal matrix (D).

12. The base station of claim 8 further comprising a controller configured to generate a control signal indicating the subcarriers which are assigned to a transmitter, whereby the subcarrier demapping units is further configured to extract the particular data mapped on the subcarriers based on the control signal.

13. The base station of claim 8 wherein the channel matrix decomposition unit is a singular value decomposition (SVD) unit.

14. The base station of claim 8 wherein the channel matrix decomposition unit is an eigenvalue decomposition (EVD) unit.

15. The base station of claim 8, wherein the unitary matrix (U) comprises eigenvectors of a product of the channel matrix (H) and the Hermitian transpose of the channel matrix (H).

16. The base station of claim 8, further comprising a transmitter configured to transmit feedback, wherein the feedback indicates a value of a signal-to-noise ratio (SNR).

17. A method for multiple-input multiple-output (MIMO) communication in a single carrier frequency division multiple access (SC-FDMA) system, the method comprising:

performing Fast Fourier Transform (FFT) on data for transmission to generate frequency domain data;

scaling the frequency domain data with an inverse of a diagonal matrix (D);

applying a steering matrix (V) to the scaled frequency domain data to generate beamformed frequency domain data, wherein the steering matrix (V) comprises eigenvectors of a matrix formed by a product of a Hermitian transpose of a channel matrix (H) and the channel matrix (H), and the diagonal matrix (D) comprises a square root of the eigenvalues of a product of the channel matrix (H) and the Hermitian transpose of the channel matrix (H);

mapping the beamformed frequency domain transmit data on subcarriers assigned for transmission;

performing Inverse Fast Fourier Transform (IFFT) on transmit data mapped to the assigned subcarriers to generate time domain transmit data; and transmitting the time domain transmit data.

\* \* \* \* \*